United States Patent

Strempke

[11] Patent Number: 5,901,898
[45] Date of Patent: May 11, 1999

[54] SYSTEM FOR REMOVING SOLDER

[75] Inventor: James A. Strempke, Eden Prairie, Minn.

[73] Assignee: Easy-Braid Company, Minneapolis, Minn.

[21] Appl. No.: 08/855,669

[22] Filed: May 14, 1997

[51] Int. Cl.$^6$ .................................................. B23K 1/018
[52] U.S. Cl. .................. 228/19; 228/52; 228/54
[58] Field of Search ................................ 228/19, 52, 54; 428/628, 608

[56] References Cited

U.S. PATENT DOCUMENTS

| Re. 32,086 | 2/1986 | Spirig | 228/19 |
|---|---|---|---|
| 3,627,191 | 12/1971 | Hood | 228/19 |
| 3,715,797 | 2/1973 | Jackson et al. | 29/426 |
| 3,726,464 | 4/1973 | Howell et al. | 228/19 |
| 3,751,799 | 8/1973 | Reynolds | 29/574 |
| 3,924,794 | 12/1975 | Allen et al. | 228/256 |
| 4,323,631 | 4/1982 | Spirig | 428/605 |
| 4,416,408 | 11/1983 | Spirig | 228/19 |
| 4,923,521 | 5/1990 | Liu et al. | 134/5 |
| 4,934,582 | 6/1990 | Bertman et al. | 228/191 |
| 5,065,931 | 11/1991 | Liu et al. | 228/19 |
| 5,284,286 | 2/1994 | Brofman et al. | 228/19 |
| 5,305,941 | 4/1994 | Kent et al. | 228/19 |
| 5,437,937 | 8/1995 | Cayless | 428/626 |
| 5,746,367 | 5/1998 | Pai et al. | 228/19 |
| 5,761,037 | 6/1998 | Anderson et al. | 361/700 |

FOREIGN PATENT DOCUMENTS

| 0604966 | 7/1994 | European Pat. Off. . |
| WO 97/37805 | 10/1997 | WIPO . |

OTHER PUBLICATIONS

"One Step (Desoldering Braid)", Easy Braid Co. (Brochure), 2, (Jan. 1995).
"One Step 2™", Easy Braid Co. (Brochure), 2, (Feb. 1996).
"Quick Braid™", Easy Braid Co. (Brochure), 2, (Jan. 1995).
"Sea Braid™", Easy Braid Co. (Brochure), 2, (Jan. 1995).
"Single Component MS–1 Micro Stencil System & User's Guide", *MS–1 Micro Stencil Manual,* 4, (Mar. 1996).
"Solder (One Step Solder)", Easy Braid Co. (Brochure), 2, (Feb. 1996).

*Primary Examiner*—Patrick Ryan
*Assistant Examiner*—Carlos J. Gamino
*Attorney, Agent, or Firm*—Schwegman, Lundberg, Woessner & Kluth P.A.

[57] ABSTRACT

The misapplication or misplacement of solder bumps on chips and/or circuit boards presents financially significant waste and cost efficiency problems in the manufacture of electronic components. The present invention describes an article and a process for using the article to more quickly remove such spurious solder during manufacture of components. The present invention may comprise an article for assisting in the removal of solder from a surface comprising: a) a surface layer of textured material which can be wet by molten solder, b) a first thermally conductive layer having a surface which is in thermal contact with said surface layer, and c) preferably a flux which is present on at least one of said surface layer and said thermally conductive layer having a surface in thermal contact with said surface layer. The article may be preferably provided where the first thermally conductive layer comprises a sheet of flexible, thermally conductive metal, especially aluminum. The performance of the article may be generally enhanced by providing the thermally conductive layer as a metallic layer with its surface having a layer of material which can be wet by molten solder.

11 Claims, 2 Drawing Sheets

SYSTEM FOR REMOVING SOLDER

BACKGROUND OF THE INVENTION

1. Field of the Invention

The present invention relates to the manufacture of articles using solder, particularly the manufacture of articles having electrical connections which use solder to provide areas where electrical contacts are attached or electrical connections made, and most particularly to the manufacture of circuit boards where solder is used to provide electrical contact points or points of adhesion for electrical connections, and to the removal of excess solder in such manufacturing processes.

2. Background of the Art

Solder has been used for literally centuries in the adherence of metal components together. Solder is a relatively low melting metal or alloy (usually lead and tin, with other optional ingredients therein) which is melted between two components which are intended to be adhered. Because the solder usually melts at a temperature below the melting point of the metals which are to be adhered together, the solder will bond the two surfaces (the primary materials) to be adhered without the need of using temperatures which could melt or damage the primary materials, as would be the case in welding. Soldering is generally performed by cleaning two primary surfaces, applying a flux (which may further clean or maintain the cleanliness of the surface) which enables or enhances the surface to be wetted by the solder. After the surfaces have been cleaned and a flux applied, the solder is heated, allowed to flow between the two surfaces, and then cooled. The cooled solder forms a solid bond between the two primary surfaces.

One of the desirable aspects of soldering in the electrical and electronic arts is the fact that the bond between the two primary surfaces is conductive. This allows the use of the soldering technique between electrically transmissive elements, and in fact enables electrical connections to be readily effected between electrical elements. Solder deposits are often used in the electrical/electronic (the terms may be used alternatively or collectively for the description of the present invention) industry to provide connection points in premade circuit boards. The board or circuit is constructed with the electrical/electronic configuration built into the board, and the specific points where other electrical connections are to be made to the board are provided with solder points so that a connecting component may be aligned with the circuit board, and the connecting component may be heated in aligned contact (the electrical connectors aligned with the solder points where they are to be bonded) with the circuit board and the components and circuit heated to bond the components to the circuit board through the solder points.

In the manufacture of circuit boards having large numbers of point-to-point contacts needed between components, the detail in the electronic/electrical configurations and the solder points can be very complex and require great precision in the location and volumes of solder on the circuit board. These complex arrangements of electrical/electronic connections can be prepared by a number of different methods. The individual contact points may be manually applied or the entire distribution of solder points may be applied by printing type process (screen application, gravure coating, etc.). In either case, mistakes in the positioning or quantity of solder applied may occur. These mistakes, usually in the form of excess or misaligned solder deposits, can adversely affect the performance of the circuit board by preventing proper alignment of the board or a chip on the board (because of a physical anomaly in the presence of a bump or mis-positioning of solder), or the absence of solder preventing a proper electrical connection to be accomplished. Because of the desire to reduce manufacturing waste, both because of environmental concerns and the expense involved in waste, it is desirable to recover and salvage any mistakenly configured circuitry so that the circuit board may be reused. Many different types of efforts have been attempted to provide materials and processes for recovering misconfigured circuit boards.

There are basically three types of processes which are used to control or remove solder from circuit board applications. One type of process levels solder which remains on a circuit board. This leveling may be accomplished with any one of or combination of liquid (solvent) application, thermal softening, and air knifes. Such processes are exemplified as system patents by U.S. Pat. Nos. 5,593,499; 4,614,858; 4,412,641; and U.S. Pat. No. 4,285,091. Another process involves solvent or carrier material to the surface. This is shown in some of the system patents described above and are shown with fluidized beds and/or solvents in U.S. Pat. Nos. 4,769,083; 3,924,794; and 3,865,298. Wicking materials, usually applied only to the specific solder joints or collection of solder connections for an individual component are shown, for example, in U.S. Pat. Nos. 4,323,631; 4,923,521; 5,065,931; 3,715,797; 4,416,408; 4,934,582; and RE 32,806.

U.S. Pat. No. 4,934,582 describes a method and apparatus for the removal of solder mounted surface mount electronic components which includes the removal of old solder, broken leads, and the electronic component without damaging other devices on the substrate. A desoldering braid is shaped to cover each of the electronic component's outer lead bonds without contacting the component's base. The desoldering braid is heated and brought in contact with the bonds until the solder flows into the desoldering braid and any broken outer leads attach to the desoldering braid. Upon removal of the desoldering braid the electronic component can be lifted off the surface. The desoldered solder joints will contain a thin uniform coating of solder less than approximately 50 micro inches thick. This allows for removal and replacement of solder mounted electronic components with leads on center lines spaced less than 0.020 inches.

U.S. Pat. No. 4,905,371 describes an apparatus and method for a cleaning process control. The apparatus includes a printed wire circuit board that is made on a Pyrex glass or other transparent substrate. Components are attached to the printed wire circuit board and then the circuit card assembly which is formed is cleaned using a selected cleaning process. The circuit card assembly can then be inspected to determine the effectiveness of a particular cleaning process by flipping over the transparent circuit card, peering through the substrate to inspect for corrosion and solder balls. The circuit card assembly can then be cleaned more extensively and used again to check a different cleaning process.

U.S. Pat. No. 4,416,408 describes a solder removing device for absorbing solder which has been rendered molten by the application of heat, including an open-mesh structure comprising a strand and formed by knitting, as a primary example, at least the surface of the strand being metallic and receptive to solder flux (and indeed being coated with solder flux rendering it more capable of wetting with molten solder). The open-mesh structure enables the device to absorb solder more freely and in greater quantities than can prior braided devices in which the multiple strands are contiguous.

U.S. Pat. No. 3,724,418 describes the application of a thin uniform coat of hot tin lead solder to the exposed copper circuitry of electrical circuit boards utilizing a fluxing station, a standing wave soldering station, a hot liquid spray leveling station, a hot water spray cleaning station, a high volume air spray drying station and a conveyor for transporting the electrical circuit boards past the aforementioned stations. The apparatus contains those pumps, motors, tanks, and electrical and hydraulic systems necessary to support the aforementioned stations.

U.S. Pat. No. 3,715,797 describes a rope-like member of braided heat conducting metallic wires coated with a second metal and a flux is applied to a solid solder joint. Heat applied to the rope-like member liquefies the solder which in turn is absorbed into the member thereby removing solder from the joint.

U.S. Pat. No. 5,593,499 describes a dual air knife assembly for removing excess solder and leveling any remaining solder on a passing circuit board with a gas from a gas source includes a first and second air knife. The first air knife has a first passage with a first inlet adapted to connect to the gas source and a first outlet adapted to be positioned adjacent the passing circuit board. The second air knife has a second passage with a second inlet connected to the gas source and a second outlet adapted to be positioned adjacent the passing circuit board. The first air knife is adapted to be positioned substantially perpendicular to the circuit board and the second air knife is adapted to be positioned at an angle less than 90 degrees and preferably between 20 and 60 degrees to the circuit board. The dual air knife assembly may include a spacer which separates the a first and second air knife and is recessed from the outlets of the a first and second air knife to create an expansion chamber. The distance the first and second outlets are from the passing circuit board and the temperature and pressure of the gas exiting from the a first and second air knife should all be substantially the same. Typically, the dual air knife assembly is used in a soldering system which includes a conveyor, a flux station, and a solder station. The dual air knife assembly is used in a process referred to as "hot air solder leveling" to remove excess solder and more evenly distribute any remaining solder. A pair of dual air knife assemblies may be used in another soldering system where excess solder is removed and any remaining solder is leveled on both sides of a circuit board.

U.S. Pat. No. 5,065,931 U.S. patent No. describes a process for repairing electronic device packages, the problem of removing solder remnants on substrate bonding pads is solved by, first etching a pattern in silicon and metallizing the pattern to make a silicon wick. The solder remnants on the bonding pads are melted, and the etched pattern of the silicon wick is brought into contact with the remnants to remove them by capillary action. It is often convenient to heat the silicon wick so that solder remnants melt when the wick is brought into contact with them.

U.S. Pat. No. 5,007,574 describes a desoldering tool which has a removable cartridge and a base unit having an assembly interior including a solder collection chamber and a removable vacuum source for developing a vacuum in the bottom of the chamber under a removable porous solder retention pad, the cartridge having a temperature self-regulating heater therein and a tail pipe extending from a tip of the cartridge to a position above the solder collection chamber, and a vacuum seal between the cartridge and the base unit to maintain the vacuum and reduce transfer of heat from the tip.

U.S. Pat. No. 4,923,521 describes a process for repairing electronic device packages. The problem of removing solder remnants on substrate bonding pads is solved by, first, etching a pattern in silicon and metallizing the pattern to make a silicon wick. The solder remnants on the bonding pads are melted, and the etched pattern of the silicon wick is brought into contact with the remnants to remove them by capillary action. It is often convenient to heat the silicon wick so that solder remnants melt when the wick is brought into contact with them.

U.S. Pat. No. 4,614,858 describes a desoldering tool for removing soldered electronic components from printed circuit boards which includes a plurality of electric heater bars disposed in spaced apart, opposed relationship so as to grasp the component to be removed. The heater bars are shaped to contact the solder terminations to be desoldered and are composed of an alloy of high electrical resistivity, such as Nichrome. The heater bars are each removably attached to a pair of cantilever spring plates carried by the enlarged end of the handle of the desoldering tool by a different pair of bus bars enclosed in a molded plastic housing providing support and electrical insulation. One bus bar of each pair is rigidly attached to one spring plate while the other bus bar is attached to the other spring plate so that the cantilever spring plates urge the heater bars against the solder terminations and retain the component for physical removal. The leads of a power cord extending through the handle are electrically connected to the spring plates for supplying heating current to the heater bars through the bus bars.

U.S. Pat. No. 4,412,641 describes a device for desoldering electronic components from circuit boards which has a soldering nozzle which produces a solder wave that is directed from below the circuit board against the component to be desoldered; thereby dissolving previous solder bonds. The component can then be lifted out from above and suction is applied from below to the now-opened bores of the circuit board, to remove residual solder from them. A new component can then be installed, using the same equipment.

U.S. Pat. No. 4,323,631 describes a solder removing device is disclosed including fibers of temperature-resistant non-metallic material, such as a synthetic polymeric material, for example FEP or PTFE, which are coated with a metal rendering them more receptive to solder flux. The metallized fibers are coated with solder flux rendering them more capable of wetting with molten solder, interstices between the fibers serving to absorb molten solder by capillary attraction.

U.S. Pat. No. 4,285,091 and U.S. Pat. No. 4,187,973 describe a desoldering system which operates in conjunction with a soldering instrument which may be of the temperature controlled type disclosed and specifically designed for simultaneously desoldering dual-in-line integrated circuit packages, having for example 14 or 16 pins, multiple pins for transistors, 8 or 10 pin round integrated circuit packages and the like. Due to the large throughput of air required to the vacuum system the desoldering attachment features large inlet pipes. The desoldering tip is directly screwed onto the heating element of a soldering instrument surrounded by an air tight sleeve which includes a filter or trap for the solder. The sleeve of the desoldering instrument in turn is connected to another barrel which may include an additional filter and is provided with a three-way trigger valve. The valve selectively connects the desoldering attachment to a vacuum line to pull in the solder, it closes the vacuum line when not depressed, and provides access to the outside air for removing the solder collected in the desoldering attachment. A solder extractor is provided for this purpose. It is connected to a vacuum line and features a snap action to uncover a vacuum connection whereby the desoldering tip and its sleeve may be cleaned by sucking out the solder.

SUMMARY OF THE INVENTION

A layered material is provided in sheet, strip or patch format which can readily remove complete patches of solder patterns and excess solder on electric/electronic circuit board. The material is laid over the entire area where the excess solder or pattern of solder is to be removed, and heat is provided to the material. Solder in contact with the material wicks into a patterned or textured surface of the material and is removed from the circuit.

The basic solder removing element comprises at least 1) a textured surface which can wick melted solder, 2) flux which is present on said textured surface during the wicking step (either predeposited on the textured surface, released from behind the textured surface when porous, or applied to the texture surface immediately before or during wicking), and 3) a heat retaining layer supporting the textured surface.

DETAILED DESCRIPTION OF THE PRESENT INVENTION

Figure 1:
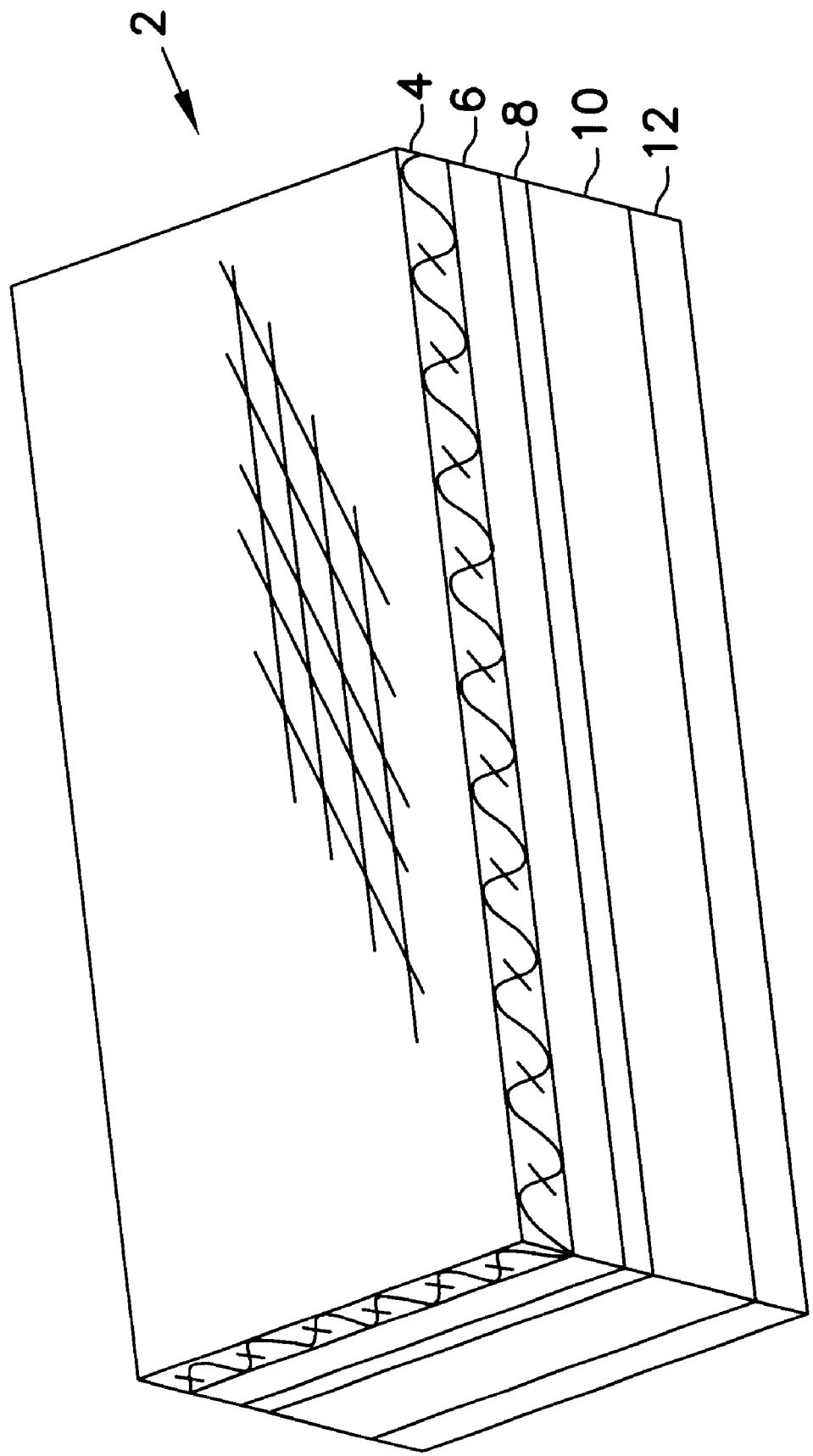
FIG. 1 shows a perspective drawing of a preferred solder removing element 2 of the present invention.

The present invention may comprise an article for assisting in the removal of solder from a surface comprising:

a) a surface layer of textured material which is wetted by molten solder, b) a first thermally conductive layer having a surface which is in thermal contact with said surface layer, and c) a flux which is present on at least one of said a) surface layer and said b) thermally conductive layer having a surface in thermal contact with said surface layer. The article may be preferably provided where the first thermally conductive layer comprises a sheet of flexible, thermally conductive metal, especially aluminum. The performance of the article may be generally enhanced by providing the thermally conductive layer as a metallic layer with its surface having a layer of material which can be wet by molten solder.

The article may be preferably used in a process for removing a pattern of solder from an area of a surface comprising providing the herein described article, which has dimensions greater than the area of the surface, placing the textured surface of the article in contact with all of the solder within the area, providing sufficient heat to the area to soften the solder so that it wicks into the textured surface, and removing the article along with solder which has wicked into the textured surface.

A solder removing element comprises a textured, solder wicking layer supported by a thermally conductive layer. When used, the solder removing element must have a flux in contact with at least one of the textured wicking layer or a surface of the thermally conductive layer. As the flux also acts to protect the solder wicking surface from oxidation, if the flux is present on only one of these two layers rather than both of the layers, the surface of the other layer should have an antioxidation layer on the surface which is removed or removable before or during the solder removing heating step. The textured solder wicking layer is a surface that has both the structure to allow wicking or adherent attachment of solder to the surface and a composition which has sufficient physical compatibility with melted solder to allow the appropriate surface tension and attraction of the solder to the surface to allow wicking or adherence. The structure can be provided in many ways, including, but not limited to microreplication of a surface, molding of fine details into a surface, etching of a surface, ablation of detail into a surface, physical puncturing of pores into a surface (e.g., a film of material with textured or non-textured punctures in the film), fabrication (non-woven, woven, knitted or other patterns) of metal fibers, strips, or filaments into a surface, or any other means which provides a surface structure which is capable of allowing wicking of solder thereon. Fabric-like structures, whether woven, knitted or non-woven are the most preferred because of their relatively higher surface area/weight and volume contributions. The pore size in such structures may vary from a few microns to a few millimeters, but pore sizes of from 0.01 to 2 mm is generally preferred, with 0.05 to 2 mm more preferred for the open spaces between adjacent fibers or filaments within the structure. The composition of the textured material may comprise any material the surface of which has an affinity (philicity is the term normally used with respect to the wetting/surface tension associability/ attraction) between the liquid (melted) solder and the surface. Copper material, either pure copper or coated copper material is by far the material of choice for the solder absorptive layer. Copper blends (e.g., with discontinuous phases of copper) or copper alloys, such as bronze or brass, may also be used, but pure copper is preferred. Oxygen-free copper (that is where the bulk of the copper, exclusive of the surface which is readily oxidized by atmospheric oxygen) is preferred. Oxygen-free copper is preferred because of its greater attraction for solder, even as compared to copper which contains minor amounts of oxygen in its bulk. Oxygen-free may be used to denote copper with less than one part per hundred thousand, one part per million of oxygen in its bulk, or less. It is also preferred that the composition of the textured surface have a sufficiently high heat capacity, thermal conductivity, and high melting point to work within the environment of melted solder. Metal compositions, particularly copper, copper alloys, or copper-containing compositions, including copper coated polymeric materials are the preferred compositions of the textured material. Fabricated (woven, knitted or non-woven) filamentary or fibrous copper or copper-containing materials are most preferred. Non-woven materials have a greater ability to have their porosity readily controlled and can provide greater surface area per unit weight because of the more reticulated structure in the fabric. The textured material should be flexible to allow the material to conform to a circuit board surface when being used to remove the solder. If the material were not flexible or bendable (as with thin metal support backings), the conformation of the wicking sheet and the circuit board would be reduced.

Preferred woven copper cloth will have a weave of between 2 and 200 mesh per linear inch, with wire diameters appropriately sized (usually less than 0.075 inch diameters, to achieve the weave. The diameter of the filament will generally decrease with the increase number of mesh per inch. For example, a preferred mesh size of 100 mesh per inch will have an approximately 0.0045 inch diameter wire and a width opening of about 0.006 inches between the weave wires. The open area of the weave will usually be less than 80% area, and usually will be between 10 and 75%, more preferably between 15 and 50% and most preferably between 20 and 45% open area. Non-woven fabric may have fibers and filaments of similar dimensions and can provide increased surface area, even in comparison to the woven or knitted structures.

Preferred constructions of the sheet of the present invention may be described as follows. Looking at FIG. 1, a solder removing element 2 comprises a surface layer 4 of a textured solder compatible material, here shown to be a woven fabric of copper having 100×100 mesh per linear inch, a wire diameter of 0.0045 inches, a width opening of 0.006 inches between mesh, and an open area of about 30.3%. Underneath the textured surface layer 4, when the layer is porous, is a surface of solder compatible material 6, preferably a layer 6 having a surface of copper, or the layer 6 comprising only copper. The solder compatible material 6 of this example was provided as copper foil tape having a total thickness of 2.75 mils with a copper foil layer (provided as 1.4 mils of copper) with an acrylic, pressure-sensitive adhesive (not shown, but comprising 1.35 mils dry thickness), which has a 1 ohm-inch$^2$ surface resistivity (this value being a commercial specification which is not necessarily important to the practice of the present invention.

In the preferred embodiment of the invention, the layer 6 is secured to a support layer 10 which is preferably a metal support, especially a bendable or flexible metal support such as aluminum, lead, or metal coated polymer. The support layer 10 which carries the solder compatible layer 6 provides significant function to the solder removing element, beyond the mere support function. This layer, as noted above, conducts heat and distributes the heat uniformly over the area of the circuit board or other surface which is to have solder removed therefrom. The support also provides physical strength and maintains a relatively flat surface to the solder removing article. If the solder removing article were not able to retain its flatness during shipping and handling, the article would not as easily present a flat surface towards the surface from which solder is being removed and the efficiency of the article would be reduced. If the article were to be bent, it would not always be practical to apply sufficient force during solder removing processes to assure than any wrinkles, folds or bends in the support are removed. Significant force which might exceed to tolerances of the article from which solder is being removed may have to be used. It has been contemplated that a slight bowing of the support to provide a slightly concave surface towards the surface from which solder is removed would be desirable, as that type of bowing is readily straightened out, while convex bowing might leave the edges of the solder removing article out of contact with the surface from which solder is to be removed. Such bowing should not put the edges of the article more than 2 mm out of planarity with the center of the article, when the article is 3 cm in width. It is convenient to assemble the article by having the layer 6 secured to the support layer 10 by an adhesive layer 8, but the layer 6 may be attached to the support layer 10 by any convenient means, such as wrapping a foil of the surface layer 6 material around the support 10, depositing a layer of the material of layer 6 onto the support 10 as by electroless, vapor, decomposition or electrical deposition, or any other means of applying the solvent compatible layer 6 onto the support layer 10 material. An optionally preferred backing layer 12 which is thermally conductive is also shown in FIG. 1. This layer 12 happens to be copper which provides another surface to pick up any stray solder which may come into contact with the obverse surface during use. The surface of the solder compatible layer 6 may have a coating of flux (dried or not) and the textured surface 4 may have a coating of flux thereon or therein (not shown). This improves the flow of the solder into the texturing during solder removal. The solder compatible layer should not be uniformly bonded across its entire surface to the textured solder compatible layer as this would effectively reduce the surface area of contact available between the textured layer, the solder compatible layer and the solder. This would reduce the volume and speed with which solder would adhere to the solder compatible surfaces and be removed from the surface.

The support layer 10 is preferably made out of aluminum as that provides a range of desirable properties. The support 10 would be thermally conductive, electrically conductive, light-weight, have a moderate heat capacity, without requiring large amounts of energy to elevate its temperature nor long periods of time to cool down. This balance in properties is desirable so that, for example, when heating is ceased from the back side of the solder removing article, the temperature of the support 10 decreases at a sufficiently rapid rate as to allow the solder to harden or at least thicken and adhere firmly to the solder removing article. The support layer, depending upon the material from which it is constructed, may have a wide range of thickness, and its properties may be varied in response to the need for specific end uses. The support layer may be relatively thin, such as for example 4 mils (0.1 mm) or may be relatively thick (e.g., 0.2 inches or 2.5 mm). The preferred thickness for general usage is in the range of 0.2 to 2.0 mm, more preferably 0.25 to 1.5 mm, especially when the support is made of aluminum or aluminum coated materials. The support may be tailored of specific materials to provide particularly desired properties, such as dead-fold characteristics (the ability to hold a sharp edge fold applied to the article) provided by polymeric film coated with flexible metal (e.g., lead or aluminum) or balanced thicknesses of the polymer and metal to provide the balance of properties necessary for the folding characteristics. This dead-fold characteristic would be particularly useful where the solder absorbing element would be used mechanically and the element shaped around a chip or other three dimensional surface for removal of solder.

Figure 2:
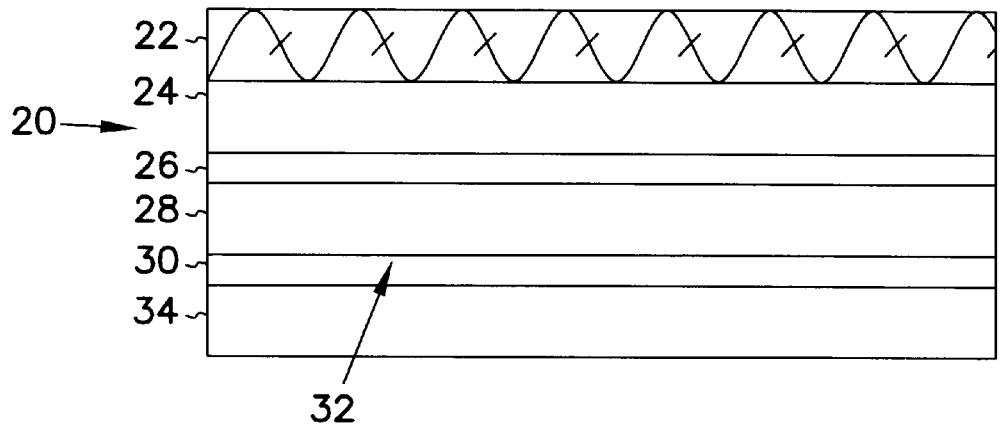
FIG. 2 shows an edge view of a preferred solder removing element 20 of the present invention.
Figure 3:
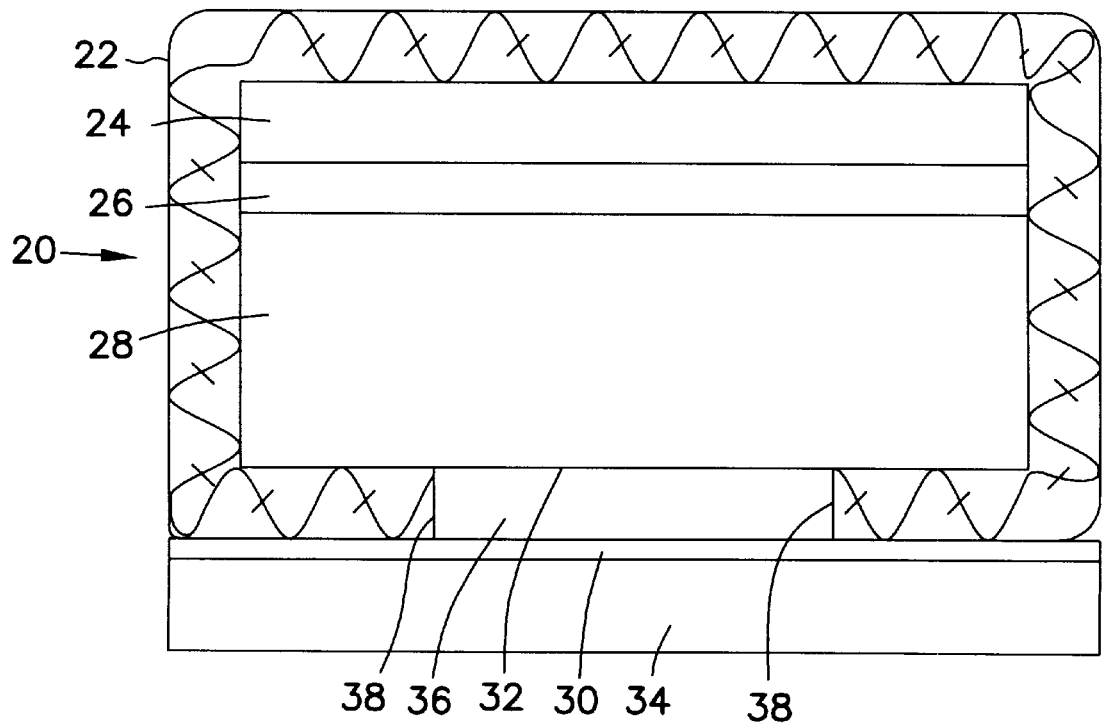
FIG. 3 shows a side view of another alternative embodiment of the solder removing element 20 of the present invention.

FIG. 2 shows another view of a slightly modified edge view of a preferred structure for the solder removing element 20 of the present invention. This structure shows the already described elements of the solder compatible textured layer 22 (again shown as a woven layer), the solid, impervious solder compatible second layer 24, and adhesive layer 26 bonding layer 24 to the structural support layer 28 which is shown as an aluminum layer 28. The back side 32 of the element 20 has a second adhesive layer 30 securing a thermally conductive layer 34 of copper to the back side 32 of the element 20. Because the textured element 22 is shown to be secured into the solder removing element 20 by ends 38 which extend under the second adhesive 30 and the back thermally conductive layer 34, a space 36 may be present in the element 20, see FIG. 3. This space 36 may not be uniform across a width of the element 20, but may provide separation between the back side 32 and the adhesive 30 only in spaces adjacent to the ends 38 of the textured material 22. If the adhesive layer 30 is applied by means which are flowable, e.g., a liquid applied adhesive or thermal adhesive, there may be no space at all. When the adhesive is applied in the preferred manner of the invention, as a pressure-sensitive adhesive layer on a surface of a thermally conductive material 34, there will be insignificant flow, and some small spacing will exist between a portion of the adhesive layer 30 and the back side 32 of the support layer 28. In a preferred embodiment, the article of the present invention does not have the surface layer of textured material which is wetted by molten solder bonded across its entire surface to the thermally conductive layer.

When the wicking surface of the element is placed into contact with the area of a surface from which the removal of solder is desired, the solder must be elevated to a temperature at which it will flow so that it can be wicked into the texture surface by surface tension. The solder may be at this flow temperature when the removal element is applied to that surface, or the solder may be heated to the flow temperature after the contact has been made. The latter is the more conventional method, usually because it is also desirable to have the removal element at an elevated temperature, even if not at or above the flow temperature, so that the solder will not solidify too quickly when wicked into the textured surface. If this were to occur, there might be insufficient removal of solder because of limited volume capability of the textured surface if the texturing were blocked (by solidified solder) before complete removal from the surface. Heating may be effected by any convenient means, including, but not limited to heated air flow, resistive heating of the circuit or the textured surface, irradiation (e.g., by a wavelength absorbed by the board, solder and/or textured surface), heating plate, heating tip, etc.

The effect of the solder compatible surface 6 on the support 10 has been shown to be quite pronounced. Where aluminum was used as the support layer 10 without any special treatment of the surface facing the textured solder wicking layer 4, the solder removing article works well, but when that surface is coated with a solder compatible material (as with the copper foil tape described above), the volume per unit area of solder which is wicked and retained by the article during actual use increases dramatically. For example, when an edge of the article is dipped into molten solder, and one surface of the article has copper facing and the other is uncoated aluminum, molten solder has been seen to wick more than twice as far up the face of the article on the copper coated face of the article than on the uncoated face of the article. This is an unexpected and untaught benefit in the performance of a preferred structure of the present invention. The surface area of the face with the copper has the solder more evenly distributed along its face, rather than collected as a drop or bead on the edge, indicating that a smoother transfer of solder to the article occurs on surfaces where the support layer has a solder compatible coating thereon, which could prevent drippage from the article. This would clearly be an environmental and safety advantage to the use of the solder removing article of the present invention.

Many different types of circuitry configurations are used in commerce. The order and arrangement of the circuit connection is chosen at the discretion of the designer and manufacturer of the circuit. Amongst the more recent format introductions for circuit contacts are Ball Grid Arrays (BGAs) and Flip Chips. Ball grid arrays are flat panels of contacts which look like columns and rows of embedded ball bearings, with each exposed ball being a potential electrical connection or contact point. The circuitry may be configured into the circuit board (with electrical connections amongst or between each bearing, a single electrical port may access the circuit from a side electrical contact, and the like. Flip chips have the connecting circuitry hidden under a removal or retractable panel, with the contact points or electrical connection sites available on the exposable surface. The practice of the present invention is useful with any of these constructions and with any other circuitry construction where solder is used on a surface.

The solder removing article of the present invention may be used in many different formats and manners. The most common usage would be for the article to be provided in finite strips of material which can be pressed or cut and pressed over a surface from which solder is to be removed. The article may also be attached to a chip removing or soldering apparatus, similar to the APE, OK Industries, and PACE soldering apparatus. The combination of the systems may be performed by providing a separate feeding mechanism (preferably a simple direct linear feed of the flat solder removing article of the present invention) at or near the operating head of the primary apparatus. The feed system would timely feed the strip of solder removing material into the operating area so that the primary apparatus could alternatively attach or remove the circuit element (chip) and remove the solder when the solder removing element is fed into the area, without having to provide separate operating apparatus. This combination can be readily combined with the existing equipment which already contains a vacuum support means (which can operate with the article of the present invention which has the impervious support layer 10) while it could not operate with a conventional porous braid. The existing apparatus also includes the heating element necessary to heat the solder removing article. Therefore very little modification of existing apparatus would be necessary to configure the systems to work with the flat solder removing strips of the present invention. That system would operate by providing a supply of solder removing article, advancing the solder removing article over the area of a surface from which solder is to be removed, pressing and heating the article to remove solder, and then removing the article along with the solder from the surface from which solder has been removed. This operation may be purely mechanical, with the advance of the article being preset according to the size of the area to be cleaned, or with reading of the area to be cleaned being pre-programmed or read by the apparatus during operation to determine the amount of material to be advanced over the area to be cleaned.

EXAMPLE

A solder removal element is prepared as follows: A copper screen having 100×100 mesh per linear inch of 0.0045 inch diameter copper wire (oxygen-free copper) having an average width opening of 0.006 inches between mesh and an open area of 30.3% of the surface area of the screen is provided. An 8 mil thick aluminum sheet of 30 cm in length is provided with a surface of copper. The surface of copper is provided by applying a copper foil with a backside coating of an acrylic, pressure-sensitive adhesive. The foil with the layer of copper is applied by the adhesive onto a surface of the aluminum. The copper layer in the adhesive strip was about 1.4 mils thickness with 1.35 mils thickness of adhesive. The copper mesh was applied over the copper covered surface of the aluminum, and the sides of the mesh which extend over the sides of the aluminum sheet were folded over the aluminum base to physically secure the mesh to the support. A second strip of adhesive coated copper sheeting, having the same dimensions and properties as the first adhesive strip of copper was cut to the length and width dimensions of the aluminum strip and secured over the uncovered back side of the aluminum support layer. A commercially available flux solution (of pine sap or modified rosin, for example) was applied to the mesh surface and to the foil surface and dried. This completes the manufacture of a preferred structure for the solder removal element of the present invention.

The surface of this element with the mesh overlaying the entire surface is placed into contact with a circuit board having soldered splattered within an area having dimensions less than the width of the solder removal element. After a chip or component has been removed from a board to replace or repair it, the solder removing system of the present invention could be applied to that surface to remove the residual solder so that a correct application of fresh solder would attach the replacement piece. After placing the mesh surface into contact with the element, heat is applied to the back side of the element with a heated platen. The lead-tin solder was absorbed into the interstices of the mesh, and the surface of the circuit board which had been in contact with the solder removing element appeared to be clear of excess solder.

What we claim is:

1. An article for assisting in the removal of solder from a surface comprising:
   a) a surface layer of textured material which can be wet by molten solder,
   b) a first thermally conductive layer having a surface which is in thermal contact with said surface layer, and
   c) a flux which is present on at least one of said
      a) a surface layer and said
      b) thermally conductive layer having a surface in thermal contact with said surface layer,
   wherein said first thermally conductive layer comprises a sheet of flexible, thermally conductive aluminum having a surface layer of copper which can be wet by molten solder.

2. The article of claim 1 wherein said material which can be wet by molten solder comprises a film of copper with an adhesive layer securing said film to said thermally conductive layer.

3. The article of claim 2 wherein said textured material comprises a fabricated layer of metal materials wherein said fabricated material is selected from the group consisting of woven, knitted and non-woven elements of metal.

4. The article of claim 3 wherein said thermally conductive layer comprises a first side facing said textured material and a second side facing away from said textured surface, said second side having a second thermally conductive layer adhered thereto which comprises a material which is different from the material of said first thermally conductive layer, and said second thermally conductive material is adhered to said first thermally conductive material by an adhesive.

5. The article of claim 3 wherein said thermally conductive layer comprises a first side facing said textured material and a second side facing away from said textured surface, said second side having a second thermally conductive layer adhered thereto which comprises a material which is different from the material of said first thermally conductive layer, and said second thermally conductive material is copper adhered to said first thermally conductive material by an organic polymeric adhesive.

6. The article of claim 2 wherein said surface layer of textured material which can be wet by molten solder is not bonded across its entire surface to said thermally conductive layer.

7. The article of claim 1 wherein said textured material comprises a fabricated layer of metal materials wherein said fabricated material is selected from the group consisting of woven, knitted and non-woven elements of metal.

8. The article of claim 7 wherein said thermally conductive layer comprises a first side facing said textured material and a second side facing away from said textured surface, said second side having a second thermally conductive layer adhered thereto which comprises a material which is different from the material of said first thermally conductive layer.

9. The article of claim 8 wherein said surface layer of textured material which can be wet by molten solder is not bonded across its entire surface to said thermally conductive layer.

10. An article for assisting in the removal of solder from a surface comprising:
   a) a surface layer of textured material which can be wet by molten solder,
   b) a first thermally conductive layer having a surface which is in thermal contact with said surface layer, and
   c) a flux which is present on at least one of said a) surface layer and said b) thermally conductive layer having a surface in thermal contact with said surface layer, wherein said first thermally conductive layer comprises a sheet of flexible, thermally conductive metal, said thermally conductive metal comprises aluminum, and said thermally conductive metal comprises aluminum with a surface comprising a layer of copper.

11. The article of claim 10 wherein said textured material comprises a fabricated layer of metal materials wherein said fabricated material is selected from the group consisting of woven, knitted and non-woven elements of metal.

* * * * *